United States Patent
Perrin et al.

(10) Patent No.: US 11,226,979 B2
(45) Date of Patent: Jan. 18, 2022

(54) DATA SYSTEM WITH ASYNCHRONOUS BATCH PROCESSING

(71) Applicant: salesforce.com, inc., San Francisco, CA (US)

(72) Inventors: Richard Duane Perrin, Zionsville, IN (US); Shawn Crosby, Bedford (CA) (US); Suraj Shrestha, Indianapolis, IN (US); Anthony Sparks, San Francisco, CA (US); Zhenge Li, Halifax (CA); Clarence Richard Farrell, Halifax (CA); Robert Hite, Noblesville, IN (US); Scotty D. Gibson, Westfield, IN (US)

(73) Assignee: salesforce.com, inc., San Francisco, CA (US)

( * ) Notice: Subject to any disclaimer, the term of this patent is extended or adjusted under 35 U.S.C. 154(b) by 307 days.

(21) Appl. No.: 16/139,382

(22) Filed: Sep. 24, 2018

(65) Prior Publication Data

US 2020/0097590 A1    Mar. 26, 2020

(51) Int. Cl.
*G06F 16/25* (2019.01)
*G06F 21/45* (2013.01)

(52) U.S. Cl.
CPC .......... *G06F 16/254* (2019.01); *G06F 16/258* (2019.01); *G06F 21/45* (2013.01)

(58) Field of Classification Search
None
See application file for complete search history.

(56) References Cited

U.S. PATENT DOCUMENTS

| 2004/0019804 | A1* | 1/2004 | St. Pierre | H04L 63/083 709/227 |
| 2012/0102084 | A1* | 4/2012 | Hiltunen | G06F 1/32 709/201 |
| 2017/0064037 | A1* | 3/2017 | Das | H04W 4/18 |
| 2017/0104838 | A1* | 4/2017 | Busayarat | H04L 67/32 |

* cited by examiner

*Primary Examiner* — Giuseppi Giuliani
(74) *Attorney, Agent, or Firm* — Holland & Hart LLP

(57) ABSTRACT

A data processing manager receives a batch of data for real-time data processing. The batch of data is associated with a correlation identifier and includes a set of data objects. The data processing manager assigns, to each data object, a unique resource identifier. The data processing manager transmits a data processing request to a target data system, and the data processing request includes a set of callback functions corresponding to the set of data objects. The callback functions identify the unique resource identifier. As the target data system processes the data objects, the target data system executes the callback functions, which operate as dynamic return endpoints for the data processing results.

21 Claims, 11 Drawing Sheets

DATA SYSTEM WITH ASYNCHRONOUS BATCH PROCESSING

FIELD OF TECHNOLOGY

The present disclosure relates generally to database systems and data processing, and more specifically to data system with asynchronous batch processing.

BACKGROUND

A cloud platform (i.e., a computing platform for cloud computing) may be employed by many users to store, manage, and process data using a shared network of remote servers. Users may develop applications on the cloud platform to handle the storage, management, and processing of data. In some cases, the cloud platform may utilize a multi-tenant database system. Users may access the cloud platform using various user devices (e.g., desktop computers, laptops, smartphones, tablets, or other computing systems, etc.).

In one example, the cloud platform may support customer relationship management (CRM) solutions. This may include support for sales, service, marketing, community, analytics, applications, and the Internet of Things. A user may utilize the cloud platform to help manage contacts of the user. For example, managing contacts of the user may include analyzing data, storing and preparing communications, and tracking opportunities and sales.

The cloud platform may utilize third party data processing system for analyzing or processing data. The cloud platform may be configured to send data to the third party system and receive the processed data and processing results from the third party system.

DETAILED DESCRIPTION

Figure 1:
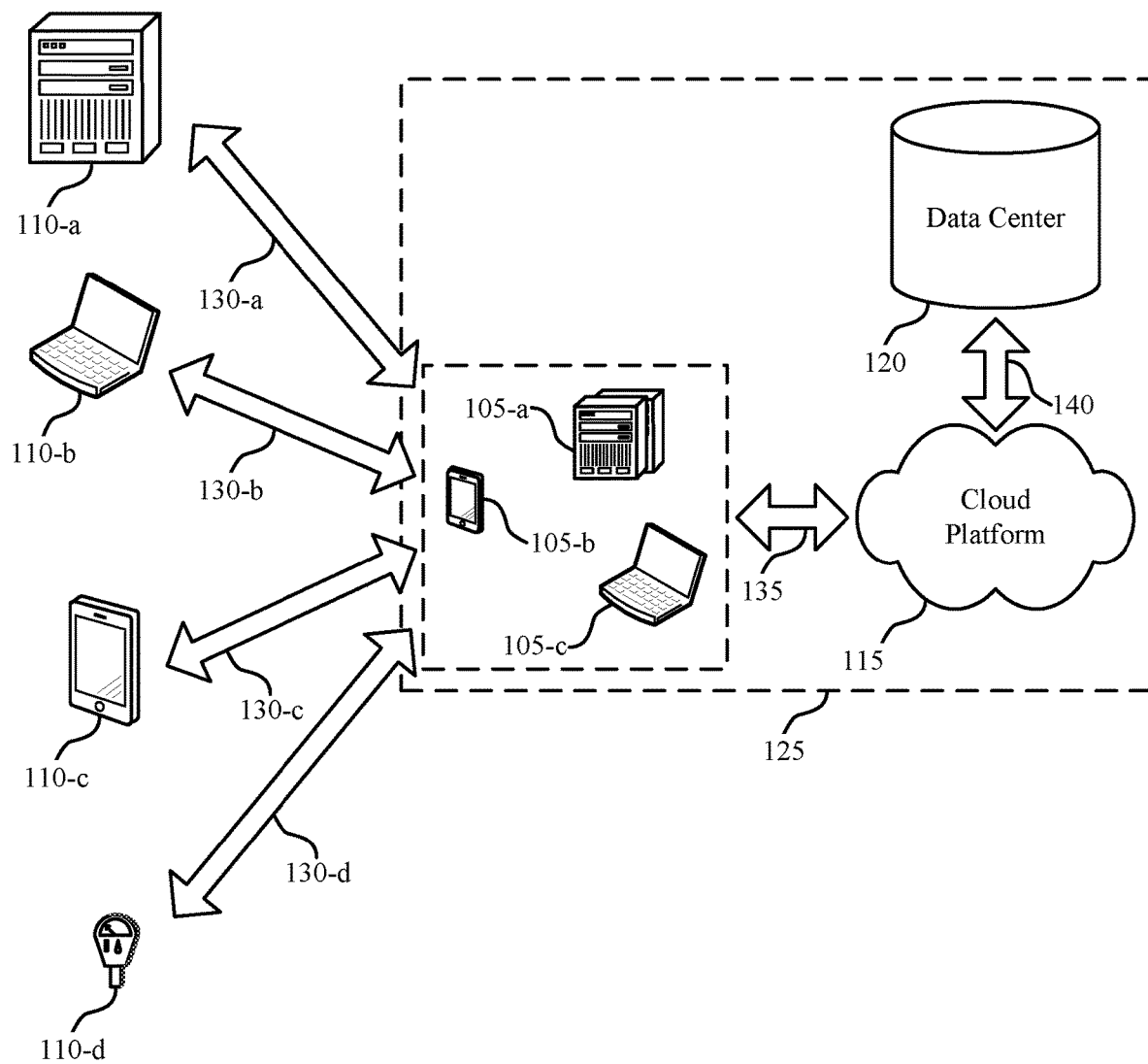
FIG. 1 illustrates an example of a system for data processing that supports asynchronous batch processing in accordance with aspects of the present disclosure.

A cloud data system may communicate with a third party data processing system for processing of data stored at the cloud data system. For example, the cloud data system sends a batch of data include a plurality of data records to the third party system. The third party system processes the batch of data and returns results of the data processing to the cloud data system. The cloud data system is referred to a source data system, and the third party processing system is referred to as the target data system. It should be understood that the implementations described herein may be used in other scenarios. For example, the implementations described may be used within a single entity's data system.

In some example implementations, the source data system is a batch processing system, and the target data system is a real-time data processing system. A batch of data is transmitted, by the source data system and to the target data system, for processing at the target data system. The batch of data may be associated with a correlation identifier and may include a plurality of data records. The data processing manager described herein assigns a unique resource identifier to each of the data records of the batch of data. The data processing manager further transmits a request for data processing to the target data system. The request may include the batch of data and callback functions corresponding to each data record of the batch of data. The callback functions may identify the unique resource identifier assigned to each of the data records. The target data system processes the data records of the batch of data and returns results using the callback functions. The data processing manager receives results of processing, documents or identifies the state of the data using the unique resource identifiers, and updates the source data system with the results. The callback functions transmitted with the data processing request function as a dynamic return endpoint for the data processing results. Further, because the data processing manager utilizes the callback functions to return results as the data records are processed, the source data system is not wasting processing resources in a waiting state. Rather, the source data system may transition into a sleeping state until data processing is complete.

Further, the use of the callback functions and the unique resource identifiers (based on the batch correlation identifier) allows the system described herein to monitor the state of data processing. For example, as results corresponding to data records are returned, the system monitors the state of records. Accordingly, the system determines when processing is complete, when processing has failed, when processing is ongoing, etc. and may notify or report, to the source data system, the state of processing. The system may also assign one or more authentication parameters to the callback functions, such that the target data system is authenticated to return the results of processing. Such an authentication configuration prevents the source data system from needing to be configured for different types of target data systems (e.g., second party or third party, internal or external).

In some cases, the system described herein reformats the batch of data including the data records for the target data system. For example, the target data system requires a specific formatting for data included in a processing request. The system formats the data before the data is sent with the processing request. Upon return of the data processing results, the system reformats the data for the source data system.

Aspects of the disclosure are initially described in the context of an environment supporting an on-demand database service. Aspects of the disclosure are further in the context of a general system diagram, a diagram illustrating the data processing request process, a diagram illustrating the data processing result process, and a data flow diagram.

Aspects of the disclosure are further illustrated by and described with reference to apparatus diagrams, system diagrams, and flowcharts that relate to data system with asynchronous batch processing.

FIG. 1 illustrates an example of a system 100 for cloud computing that supports asynchronous batch processing in accordance with various aspects of the present disclosure. The system 100 includes cloud clients 105, contacts 110, cloud platform 115, and data center 120. Cloud platform 115 may be an example of a public or private cloud network. A cloud client 105 may access cloud platform 115 over network connection 135. The network may implement transfer control protocol and internet protocol (TCP/IP), such as the Internet, or may implement other network protocols. A cloud client 105 may be an example of a user device, such as a server (e.g., cloud client 105-a), a smartphone (e.g., cloud client 105-b), or a laptop (e.g., cloud client 105-c). In other examples, a cloud client 105 may be a desktop computer, a tablet, a sensor, or another computing device or system capable of generating, analyzing, transmitting, or receiving communications. In some examples, a cloud client 105 may be operated by a user that is part of a business, an enterprise, a non-profit, a startup, or any other organization type.

A cloud client 105 may interact with multiple contacts 110. The interactions 130 may include communications, opportunities, purchases, sales, or any other interaction between a cloud client 105 and a contact 110. Data may be associated with the interactions 130. A cloud client 105 may access cloud platform 115 to store, manage, and process the data associated with the interactions 130. In some cases, the cloud client 105 may have an associated security or permission level. A cloud client 105 may have access to certain applications, data, and database information within cloud platform 115 based on the associated security or permission level, and may not have access to others.

Contacts 110 may interact with the cloud client 105 in person or via phone, email, web, text messages, mail, or any other appropriate form of interaction (e.g., interactions 130-a, 130-b, 130-c, and 130-d). The interaction 130 may be a business-to-business (B2B) interaction or a business-to-consumer (B2C) interaction. A contact 110 may also be referred to as a customer, a potential customer, a lead, a client, or some other suitable terminology. In some cases, the contact 110 may be an example of a user device, such as a server (e.g., contact 110-a), a laptop (e.g., contact 110-b), a smartphone (e.g., contact 110-c), or a sensor (e.g., contact 110-d). In other cases, the contact 110 may be another computing system. In some cases, the contact 110 may be operated by a user or group of users. The user or group of users may be associated with a business, a manufacturer, or any other appropriate organization.

Cloud platform 115 may offer an on-demand database service to the cloud client 105. In some cases, cloud platform 115 may be an example of a multi-tenant database system. In this case, cloud platform 115 may serve multiple cloud clients 105 with a single instance of software. However, other types of systems may be implemented, including—but not limited to—client-server systems, mobile device systems, and mobile network systems. In some cases, cloud platform 115 may support CRM solutions. This may include support for sales, service, marketing, community, analytics, applications, and the Internet of Things. Cloud platform 115 may receive data associated with contact interactions 130 from the cloud client 105 over network connection 135, and may store and analyze the data. In some cases, cloud platform 115 may receive data directly from an interaction 130 between a contact 110 and the cloud client 105. In some cases, the cloud client 105 may develop applications to run on cloud platform 115. Cloud platform 115 may be implemented using remote servers. In some cases, the remote servers may be located at one or more data centers 120.

Data center 120 may include multiple servers. The multiple servers may be used for data storage, management, and processing. Data center 120 may receive data from cloud platform 115 via connection 140, or directly from the cloud client 105 or an interaction 130 between a contact 110 and the cloud client 105. Data center 120 may utilize multiple redundancies for security purposes. In some cases, the data stored at data center 120 may be backed up by copies of the data at a different data center (not pictured).

Subsystem 125 may include cloud clients 105, cloud platform 115, and data center 120. In some cases, data processing may occur at any of the components of subsystem 125, or at a combination of these components. In some cases, servers may perform the data processing. The servers may be a cloud client 105 or located at data center 120.

In some cases, the cloud platform 115 may utilize third party data processing system for data processing and analysis of data stored at the data center 120 or the cloud platform 115. For example, the data center 120 is a batch data processing system and the cloud platform 115 requests data processing from a third party, real-time data processing system. The third party data processing system may offer services, such as analytics, that may be desired by a cloud client 105 or a contact 110. Accordingly, the cloud client 105 may utilize the cloud platform 115 to request processing of client data. In some cases, the cloud platform 115 is configured to utilize third party data processing without interaction by a cloud client 105 or a contact 110. In some cases, the data processing system 120 for processing batch data is internal to the cloud platform 115. In such cases, the implementations described herein may be utilized to interface between the batch processing system (e.g., source data system) and the real-time data processing system (e.g., target data system).

In some cases, when a target data system is a real-time processing system and the source data system is a batch processing system, the source data system requests processing for each record of a batch of data. Thus, the source data system makes a processing request for each data record of a batch, which may include millions of records. Furthermore, after each request, the source data system is in a waiting state for each data processing response or result. When a batch includes millions of records, the data processing requires significant processing resources. When a system is a synchronous system, the processing of millions of records may require significant compute resources, as the source system may wait for results for each record before transmitting a subsequent processing request for a next record because each request may include a static callback. Furthermore, configuration of target system data processing may require custom methods (e.g., application programming interfaces (APIs)) for each different target data system.

Implementations described herein provide a system for batching requests for data processing instead of individually requesting processing for each data record of a batch. When data processing is requested for a batch of data, a unique resource identifier and callback function is assigned to each data record. The callback function identifies the unique resource identifier, which is based on the correlation identifier for the batch and a unique data record identifier. The batch of data with corresponding callback functions are transmitted to the target data system, which processes the data and returns the results via the callback function and with the unique resource identifier. The callback functions operate as dynamic return endpoints for data processing results, and thus are blocking—meaning that the source data system is not wasting processing resources waiting on specific results for processing of each record.

Further, authentication parameters may be assigned to the callback functions, such that the target data system is authenticated to return the results to the source data system. Thus, the cloud client 105 is not required to be configured for each target system that is potentially used. When the processing request is transmitted, the target data system is automatically authenticated to return the results.

It should be appreciated by a person skilled in the art that one or more aspects of the disclosure may be implemented in a system 100 to additionally or alternatively solve other problems than those described herein. Furthermore, aspects of the disclosure may provide technical improvements to "conventional" systems or processes as described herein. However, the description and appended drawings only include example technical improvements resulting from implementing aspects of the disclosure, and accordingly do not represent all of the technical improvements provided within the scope of the claims.

In an example use of the system 100, the cloud client 105 may include a batch of data with a plurality of data records corresponding to users, customers, user devices, cloud contacts 110, etc. and a plurality of attributes may be associated with each of the data records. The attributes may correspond to attributes of users such as purchase history, web browsing history, etc. The cloud client 115 may request, from a third-party processing system, advertising campaign recommendations. A data processing manager described herein receives the batch of data including the plurality of data records, assigns unique resource identifiers to each data record and a callback function identifying the unique resource identifier to each data record. The batch of data is transmitted to the third party system, and the third party system processes each data record corresponding to a user, and returns an advertising campaign recommendation (or a ranked list of advertising campaigns) for each data record. The data processing manager monitors the state of each record (e.g., requested, returned, in progress, failed) and notifies the source data system (e.g., the cloud client 115) upon completion of processing by the third-party data processing system. Also, the data processing manager may update the source data system with results of processing as the results are transmitted by the target data processing system.

Figure 2:
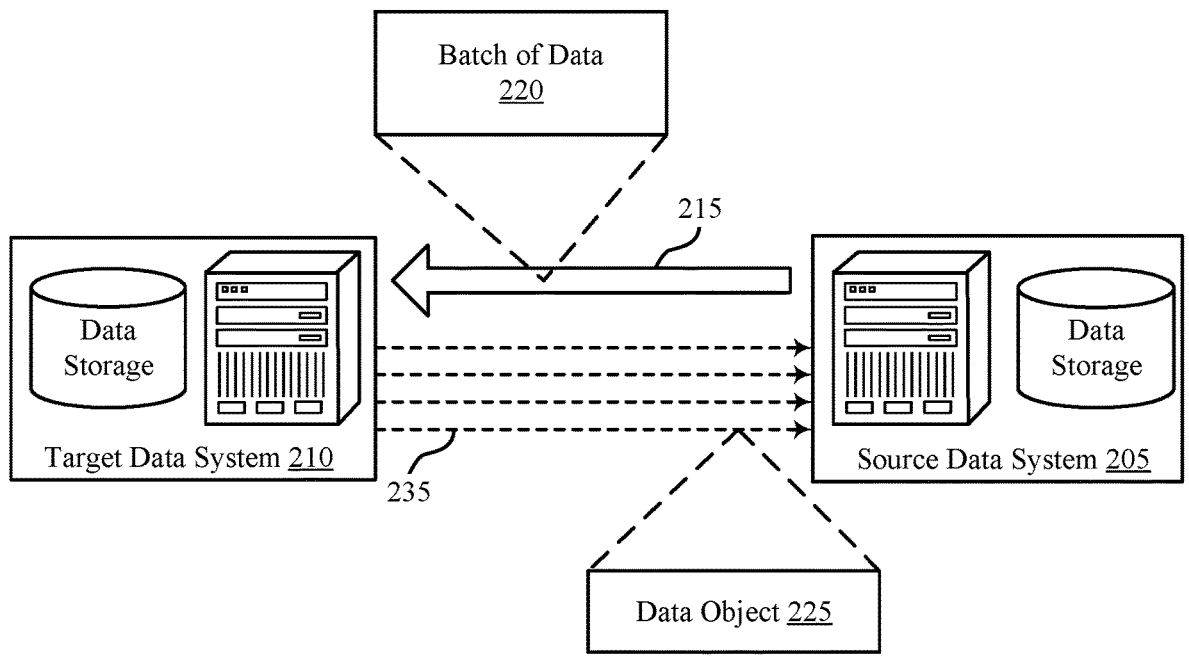
FIG. 2 illustrates an example of a system that supports asynchronous batch processing in accordance with aspects of the present disclosure.

FIG. 2 illustrates an example of a system 200 that supports asynchronous batch processing in accordance with aspects of the present disclosure. The system 200 includes a source data system 205 and a target data system 210. The source data system 205 may be an example of a cloud platform 115 or data center 120 of FIG. 1. The target data system 210 may be a data system internal to the cloud platform 115 or an external data processing system. In some cases, the source data system 205 is an example of a batch processing system, and the target data system 210 is an example of a real time data processing system. The source data system 205 and the target data system 210 may include data stores and data processing components, such as data processing servers.

The source data system 205 requests data processing from the target data system 210 over a communication link 215. The communication link 215 may be an example of an API provided by the target data system 210. The data processing request may include a batch of data 220 including a set of data objects, which may correspond to data records. The data objects may be objects that correspond to user identifiers, user devices, or another type of data. A data processing manager, which may be an example of a data processing manager 315 of FIG. 3 and 415 of FIG. 4, receives the batch of data, assigns unique resource identifiers to each data object to the batch of data 220, and transmits the data processing request to the target data system 210 with callback functions that identify the unique resource identifiers. In some cases, the data processing manager formats the data objects or the data records according to the requirements of the API (e.g., the communication link 215) provided by the target data system 210.

The target data system 210 may receive the batch of data 220 including the callback functions corresponding to each of the data records of the batch of data 220 and begin processing each data object of the batch of data 220. As the target data system 210 processes each data object of the batch of data 220, the target data system 210 may execute the corresponding callback function, which returns the results of processing a data object (e.g., a data record 225) to the source data system 205 via dynamic return endpoints 235. The dynamic return endpoints 235 are configured via the callback functions and the unique resource identifier corresponding to each data object. The data processing manager monitors the state of processing via the unique resource identifiers, and thus determines when processing is complete, processing fails, etc. The data processing manager may notify the source data system 205 when processing is complete or has halted. In some cases, the callback functions include authentication parameters, which authenticate the target data system 210 to utilize the dynamic return endpoints 235 to return the processed data records 225.

Because the source data system 205 transmits the processing request including the batch of data 220 instead of individual processing requests corresponding to each record of the batch, and because the records are assigned dynamic return endpoints (e.g., via the callback functions and unique resource identifiers), the source data system 205 may conserve processing resources by not waiting on each result of processing each data record. Rather, the source data system 205 may transition to a sleep state while the batch of data 220 is being processed.

Figure 3:
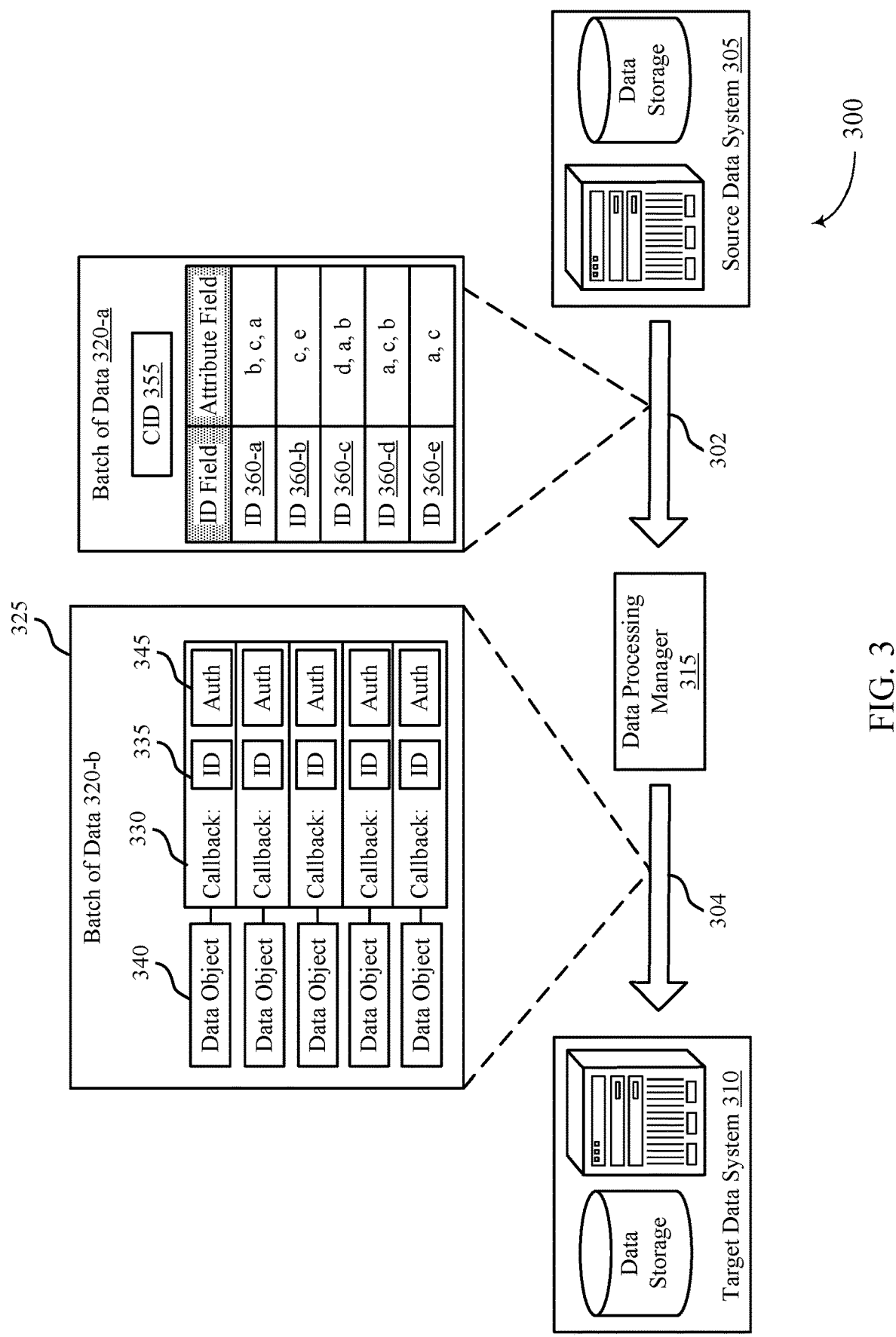
FIG. 3 illustrates an example of a system that supports asynchronous batch processing in accordance with aspects of the present disclosure.

FIG. 3 illustrates an example of a system 300 that supports asynchronous batch processing in accordance with aspects of the present disclosure. The system 300 includes a source data system 305, which may be an example of a source data system 205 of FIG. 2, a target data system 310, which may be an example of a target data system 210 of FIG. 2, and a data processing manager 315. The source data system 305 transmits a request for data processing to the target data system 310, and the request includes a batch of data 320-a. The batch of data 320-a includes a set of data objects that include a unique data object identifier 360 (e.g., ID field) and a set of attributes (e.g., attribute field) for each data object. It should be understood the this is just one example of a format for a data object and that other data object formats may be used in the implementations described herein. Because the source data system 305 sends the batch of data 320-a in the request instead of individual requests for each data record, the source data system 305 may enter a sleep state (e.g., not a waiting state for each data record). The batch of data 320-a is associated with a correlation identifier (CID) 355, which may be used to identify the batch of data 320-a.

The data processing manager 315 processes the batch of data 320-a for transmission to the target data system 310. In some cases, the data processing manager 315 is a component of the source data system 305 and may function as an interface between the source data system 305 (and potentially other source data systems) and the target data system 310. The data processing manager 315 may include or may be configured via an API for processing requests by the source data system 305. Thus, the source data system 305 may transmit the initial batch processing request (e.g., including the batch of data 320-a) to the data processing manager via a communication link 302 corresponding to the API of the data processing manager 315. The data processing manager 315 reformats the batch of data 320-a into the batch of data 320-b for transmission of a request for data processing via a communication link 304 (e.g., API of the target data system 310).

Each data object 340 of the batch of data 320-b includes a callback function 330, which identifies a unique resource identifier 335 and one or more authentication parameters 345. The unique resource identifier 335 may be generated based on the correlation identifier 355 of the batch of data 320-a and the unique data object identifier 360 corresponding to each data object 340. In some cases, the unique resource identifier 335 is generated by concatenating the unique data object identifier 360 and the correlation identifier 355. The callback function 330 that identifies the unique resource identifier 335 operates as dynamic return endpoints for processing by the target data system 310. The authentication parameter 345 provides the target data system 310 with functionality to return the results of data processing.

Figure 4:
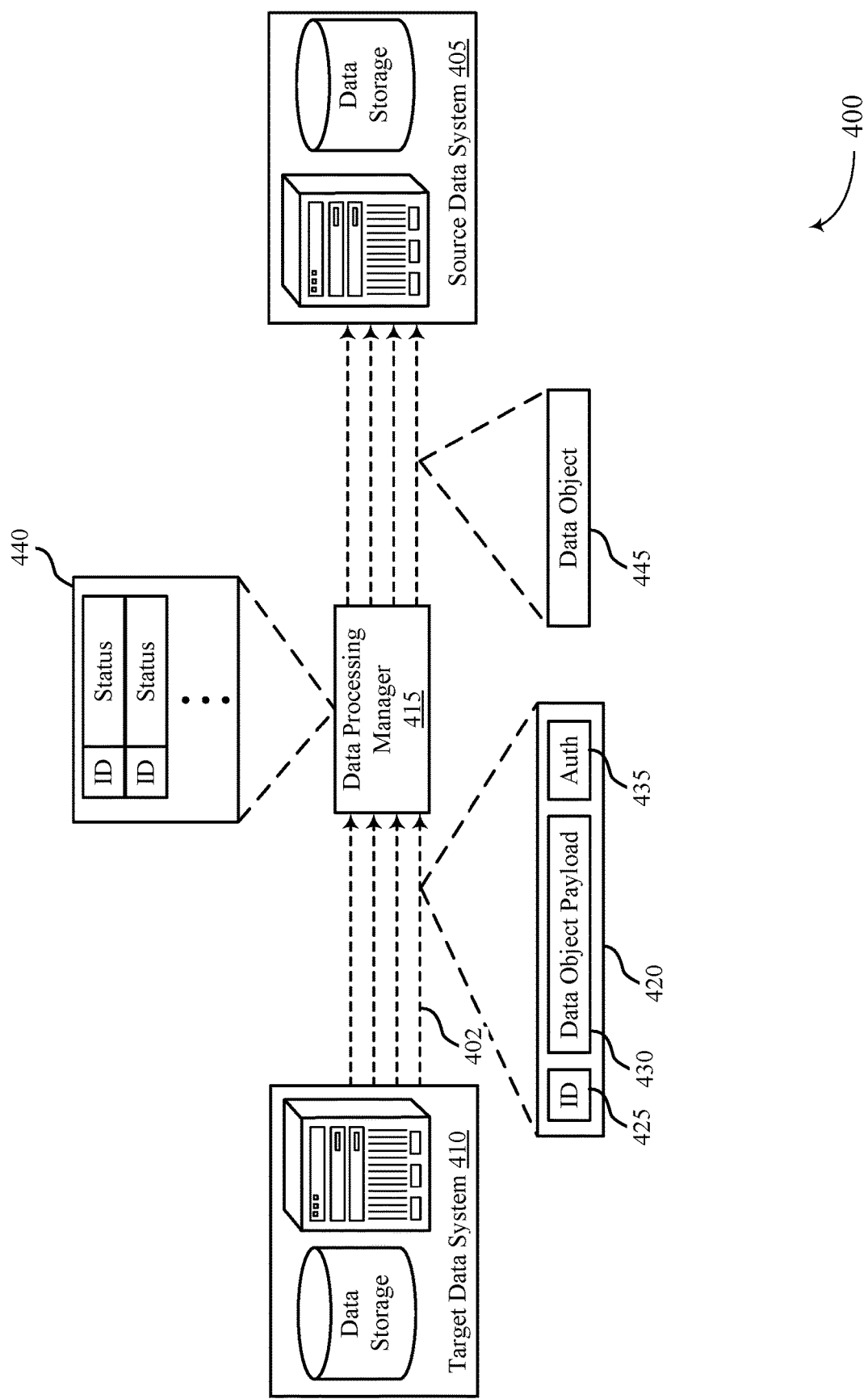
FIG. 4 illustrates an example of a system that supports asynchronous batch processing in accordance with aspects of the present disclosure.

FIG. 4 illustrates an example of a system 400 that supports asynchronous batch processing in accordance with aspects of the present disclosure. The system 400 includes a source data system 405, which may be an example of a source data system 205 of FIG. 2 or a source data system 305 of FIG. 3, a target data system 410, which may be an example of a target data system 210 of FIG. 2 or a target data system 310 of FIG. 3, and a data processing manager 415, which may be an example of a data processing manager 315 of FIG. 3. In FIG. 4, the source data system 405 sends a data processing request for data processing of a batch of data via the target data system 410 as described herein and with respect to FIG. 3. The data processing manager 415 processes the request for processing by the target data system 410. Such processing by the data processing manager 415 may include assigning unique resource identifiers to each data record of the batch of data and transmitting the request including the batch of data with callback functions assigned to each data object and which identifies the assigned unique resource identifier.

As the target data system 410 processes the data object of the batch of data, the target data system 410 calls the callback functions assigned to each data object. The callback functions return the results of the data processing as a data object payload 430 in a communication 420 via a dynamic return endpoint. The communication 420 further includes the unique resource identifier 425 and the authentication parameters 435. The authentication parameters function to authenticate the target data system 410 to access the resources of the source data system 405. As the communications (e.g., the communication 420) are transmitted to the source data system 405, the data processing manager 415 monitors the status of processing by the target data system 410. In some cases, the data processing manager 415 keeps a data status record 440 that documents or identifies the status of each data record. In some cases, the data processing manager 415 writes data objects 445 to the source data system 405 using the unique resource identifiers 425. In some cases, the data processing manager 415 reformats the data object 445 for the source data system 405. Once data processing is complete (or the processing ends), the data processing manager 415 may notify the source data system 405 of the status of processing corresponding to the batch of data. In some cases, the source data system 405 may request a status record, which the data processing manager 415 may provide. In some cases, the data processing manager 415 provides the data status record 440 which may include statuses for each data object.

Figure 5:
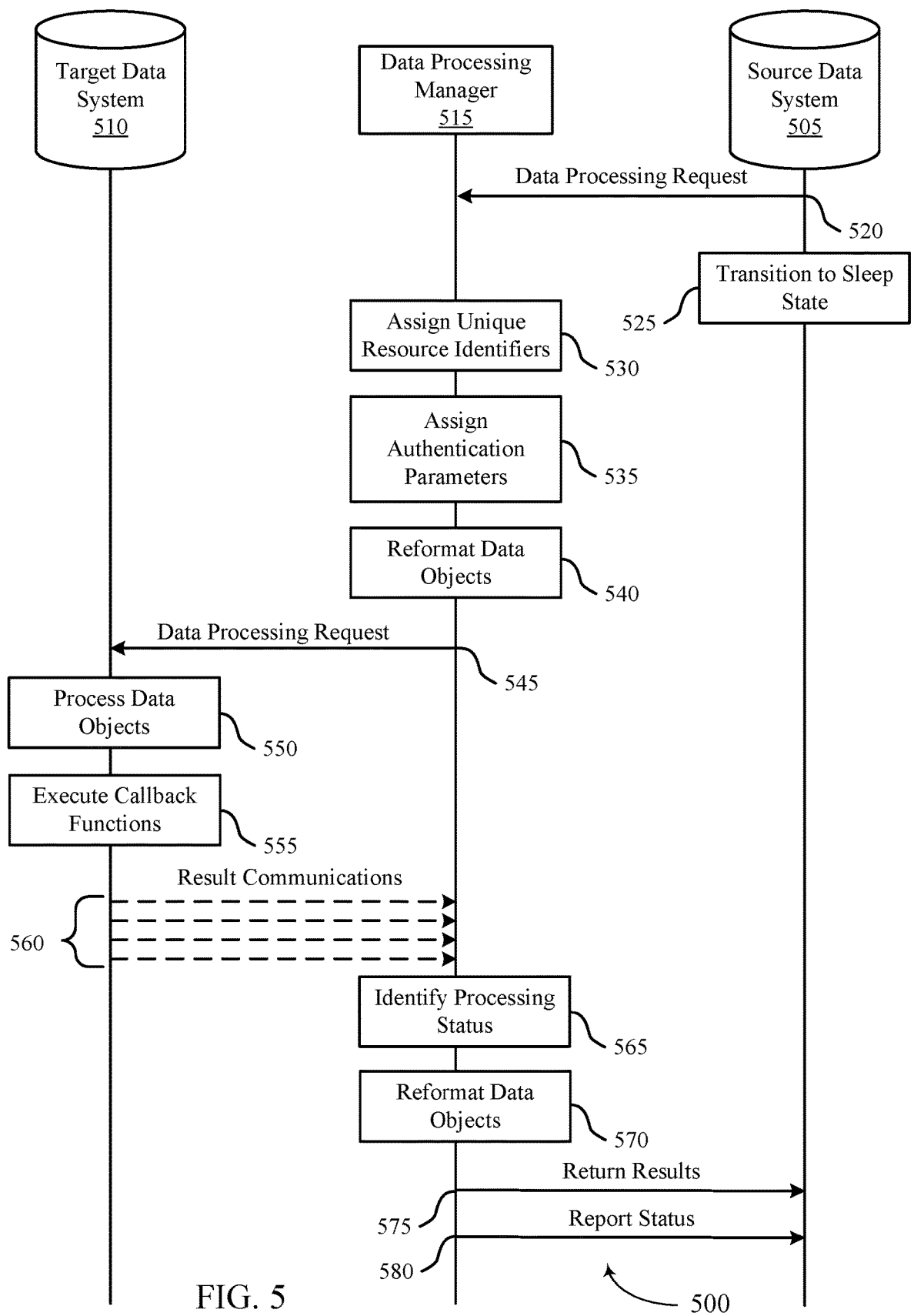
FIG. 5 illustrates an example of a flow diagram that supports asynchronous batch processing in accordance with aspects of the present disclosure.

FIG. 5 illustrates an example of a flow diagram 500 that supports asynchronous batch processing in accordance with aspects of the present disclosure. The flow diagram 500 includes a source data system 505, which may be an example of a source data system described with respect to FIGS. 2-4, a target data system 510, which may be an example of a target data system described with respect to FIGS. 2-4, and a data processing manager 515, which may be an example of a data processing manager described with respect to FIGS. 3-4. At 520, the source data system 505 transmits a request for data processing to the data processing manager 515. The request may be intended for the target data system 510. The request includes a batch of data including a set of data objects. After sending the request, the source data system 505 may transition to a sleep state at 525. The request is received by the data processing manager 515 and is associated with a correlation identifier.

At 530, the data processing manager 515 assigns, to each data object of the set of data objects of the batch of data, a unique resource identifier based at least in part on the correlation identifier and a unique data object identifier corresponding to a data object. In some cases, the correlation identifier is generated by concatenating the correlation identifier associated with the batch of data and the unique data object identifier. At 535, the data processing manager 515 assigns authentication parameters 535 for each of the data objects. At 540, the data processing manager 515 reformats the data objects according to the target data system 510. In some cases, the format for the target data system 510 is defined by an API of the target data system 510.

At 545, the data processing manager 515 transmits, to the target data system 510, a data processing request including the batch of data and a set of callback functions. Each callback function of the set of callback functions corresponds to a data object of the batch of data and identifies the corresponding unique resource identifier. Each callback function further identifies the authentication parameters.

At 550, the target data system 510 processes the data objects of the batch of data. At 555, after processing a data object of the batch of data objects, the target data system 510 executes the callback function. The target data system 510 may execute the callback function for each data object upon completion of processing of the data object. At 560, communications are transmitted to the data processing manager 515 via dynamic endpoints. The dynamic endpoints are a function of the executed callback functions and unique resource identifiers. The communications may include at least a data object payload, and identification of the unique resource identifier, and the authentication parameters. The data object payload may include the updated data object in an updated state (e.g., based on processing) or may include some additional information, such as one or more advertising campaign recommendations.

At 565, the data processing manager 515 identifies processing status based on the received result communications. Such identification may include documenting data object processing results. The identification of processing status may occur each time a result communication is received by the data processing manager 515. At 570, the data processing manager 515 reformats the data objects for the source data system 505. In some cases, the data processing manager 515 reformats the data objects as the results are received. At 575, data processing results are returned to the source data system 505. In some cases, the results are returned individually by data object, and in some cases, the results are returned when processing is complete. At 580, when the data processing is complete at the target data system 510, the data processing manager 515 reports a data processing status to the source data system 505. The report may include a notification that data processing is complete. In some cases, the operation at 580 occurs responsive to a request for status by the source data system 505. The status may include an indication of completeness, failure, in progress, etc. After receiving the results from the data processing manager 515, the source data system 505 may "wake-up," or transition to a processing state, for further batch processing of the data.

Figure 6:
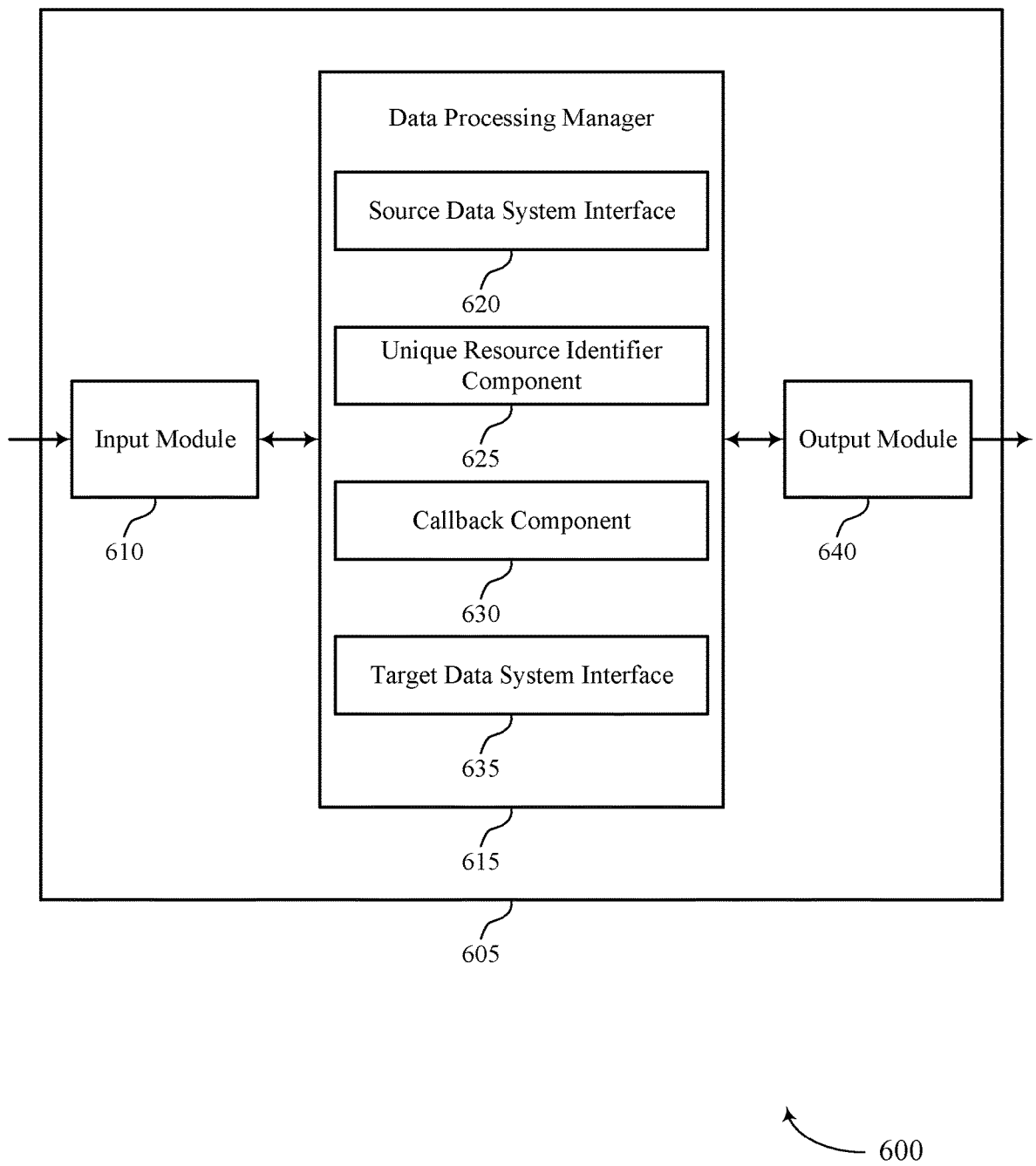
FIG. 6 shows a block diagram of an apparatus that supports asynchronous batch processing in accordance with aspects of the present disclosure.

FIG. 6 shows a block diagram 600 of an apparatus 605 that supports asynchronous batch processing in accordance with aspects of the present disclosure. The apparatus 605 may include an input module 610, a data processing manager 615, and an output module 640. The apparatus 605 may also include a processor. Each of these components may be in communication with one another (e.g., via one or more buses). In some cases, the apparatus 605 may be an example of a user terminal, a database server, or a system containing multiple computing devices.

The input module 610 may manage input signals for the apparatus 605. For example, the input module 610 may identify input signals based on an interaction with a modem, a keyboard, a mouse, a touchscreen, or a similar device. These input signals may be associated with user input or processing at other components or devices. In some cases, the input module 610 may utilize an operating system such as iOS®, ANDROID®, MS-DOS®, MS-WINDOWS®, OS/2®, UNIX®, LINUX®, or another known operating system to handle input signals. The input module 610 may send aspects of these input signals to other components of the apparatus 605 for processing. For example, the input module 610 may transmit input signals to the data processing manager 615 to support data system with asynchronous batch processing. In some cases, the input module 610 may be a component of an input/output (I/O) controller 815 as described with reference to FIG. 8.

The data processing manager 615 may include a source data system interface 620, an unique resource identifier component 625, a callback component 630, and a target data system interface 635. The data processing manager 615 may be an example of aspects of the data processing manager 705 or 810 described with reference to FIGS. 7 and 8.

The data processing manager 615 and/or at least some of its various sub-components may be implemented in hardware, software executed by a processor, firmware, or any combination thereof. If implemented in software executed by a processor, the functions of the data processing manager 615 and/or at least some of its various sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure. The data processing manager 615 and/or at least some of its various sub-components may be physically located at various positions, including being distributed such that portions of functions are implemented at different physical locations by one or more physical devices. In some examples, the data processing manager 615 and/or at least some of its various sub-components may be a separate and distinct component in accordance with various aspects of the present disclosure. In other examples, the data processing manager 615 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

The source data system interface 620 may receive, from a source data system and for processing by a target data system, a batch of data including a set of data objects, the batch of data being associated with a correlation identifier and update the source data system with the data object payload based on the at least one communication.

The unique resource identifier component 625 may assign, to each of the set of data objects of the batch of data, a unique resource identifier generated based on the correlation identifier and a unique data object identifier.

The callback component 630 may transmit, to the target data system, a data processing request including the batch of data and a set of callback functions corresponding to each of the set of data objects of the batch of data, each of the set of callback functions identifying the unique resource identifier assigned to each of the set of data objects, a callback function and the unique resource identifier identified by the callback function operating as a dynamic return endpoint for communications corresponding to processing, by the target data system, of a data object corresponding to the unique resource identifier.

The target data system interface 635 may receive, from the target data system, at least one communication via the dynamic return endpoint, the at least one communication including the unique resource identifier and a data object payload corresponding to processing, by the target data system, of the data object corresponding to the unique resource identifier.

The output module 640 may manage output signals for the apparatus 605. For example, the output module 640 may receive signals from other components of the apparatus 605, such as the data processing manager 615, and may transmit these signals to other components or devices. In some specific examples, the output module 640 may transmit output signals for display in a user interface, for storage in a database or data store, for further processing at a server or server cluster, or for any other processes at any number of devices or systems. In some cases, the output module 640 may be a component of an I/O controller 815 as described with reference to FIG. 8.

Figure 7:
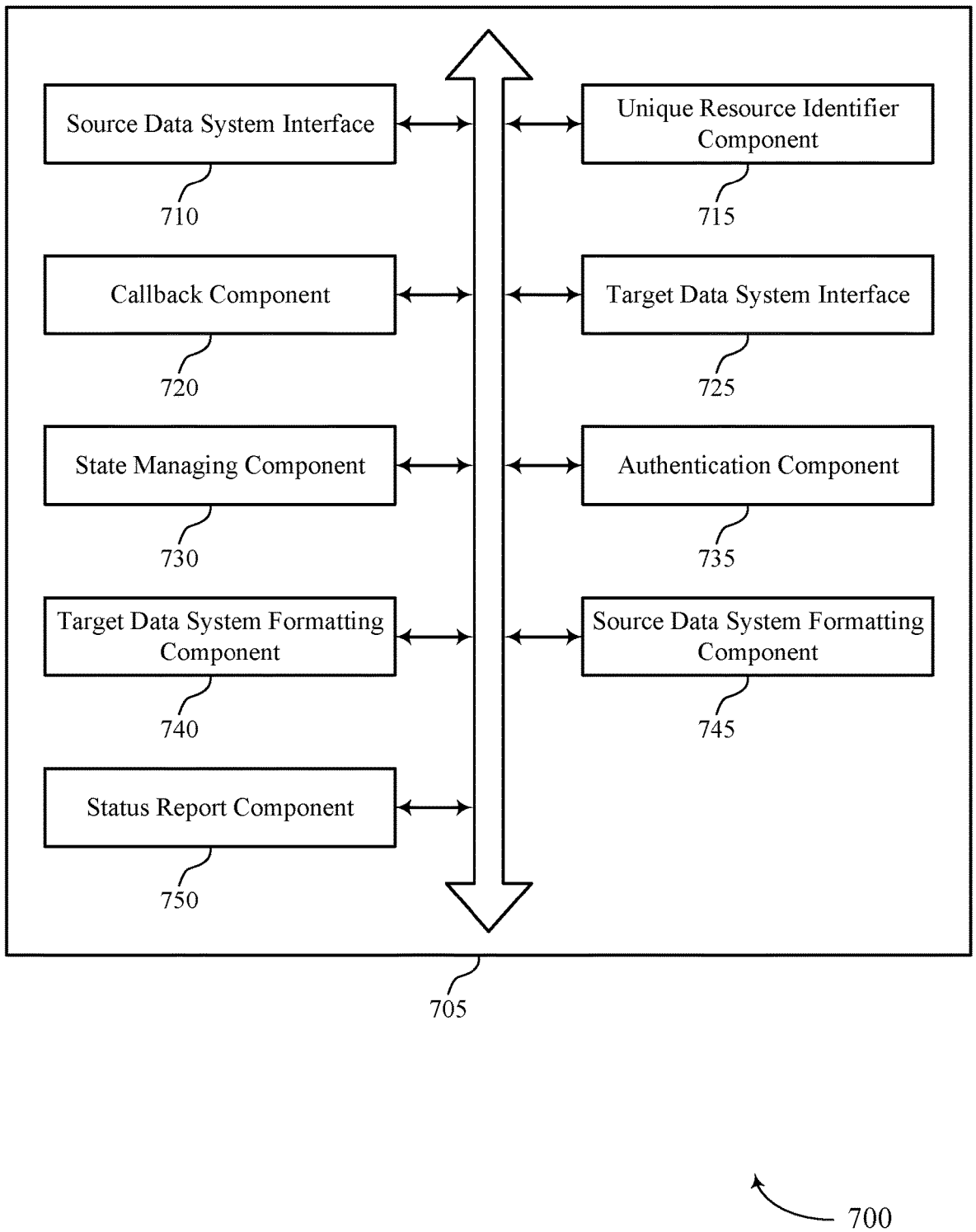
FIG. 7 shows a block diagram of a data processing manager that supports asynchronous batch processing in accordance with aspects of the present disclosure.

FIG. 7 shows a block diagram 700 of a data processing manager 705 that supports asynchronous batch processing in accordance with aspects of the present disclosure. The data processing manager 705 may be an example of aspects of a data processing manager 615 or a data processing manager 810 described herein. The data processing manager 705 may include a source data system interface 710, an unique resource identifier component 715, a callback component 720, a target data system interface 725, a state managing component 730, an authentication component 735, a target data system formatting component 740, a source data system formatting component 745, and a status report component 750. Each of these modules may communicate, directly or indirectly, with one another (e.g., via one or more buses).

The source data system interface 710 may receive, from a source data system and for processing by a target data system, a batch of data including a set of data objects, the batch of data being associated with a correlation identifier.

In some examples, the source data system interface 710 may update the source data system with the data object payload based on the at least one communication.

In some examples, the source data system interface 710 may notify the source data system of completion of processing of the batch of data including the set of data objects.

The unique resource identifier component 715 may assign, to each of the set of data objects of the batch of data, a unique resource identifier generated based on the correlation identifier and a unique data object identifier.

In some examples, the unique resource identifier component 715 may generate the unique resource identifier by concatenating the correlation identifier and the unique data object identifier.

The callback component 720 may transmit, to the target data system, a data processing request including the batch of data and a set of callback functions corresponding to each of the set of data objects of the batch of data, each of the set of callback functions identifying the unique resource identifier assigned to each of the set of data objects, a callback function and the unique resource identifier identified by the callback function operating as a dynamic return endpoint for communications corresponding to processing, by the target data system, of a data object corresponding to the unique resource identifier.

The target data system interface 725 may receive, from the target data system, at least one communication via the dynamic return endpoint, the at least one communication including the unique resource identifier and a data object payload corresponding to processing, by the target data system, of the data object corresponding to the unique resource identifier.

The state managing component 730 may identify a state of the set of data objects using the unique resource identifier assigned to each of the set of data objects, as the at least one communication are received from the target data system based on the processing, by the target data system, of the set of data objects.

The authentication component 735 may assign one or more authentication parameters to the each of the set of callback functions, the one or more authentication parameters verifying the target data system to transmit the at least one communication including the unique resource identifier and the data object payload.

The target data system formatting component 740 may reformat each of the set of data objects for processing by the target data system.

The source data system formatting component 745 may reformat the data object payload for receipt by the source data system.

The status report component 750 may receive, from the source data system, a status report request corresponding to the processing of the batch of data by the target data system.

In some examples, the status report component 750 may transmit, to the source data system, a status report indicating processing status corresponding to processing of the batch of data by the target data system.

Figure 8:
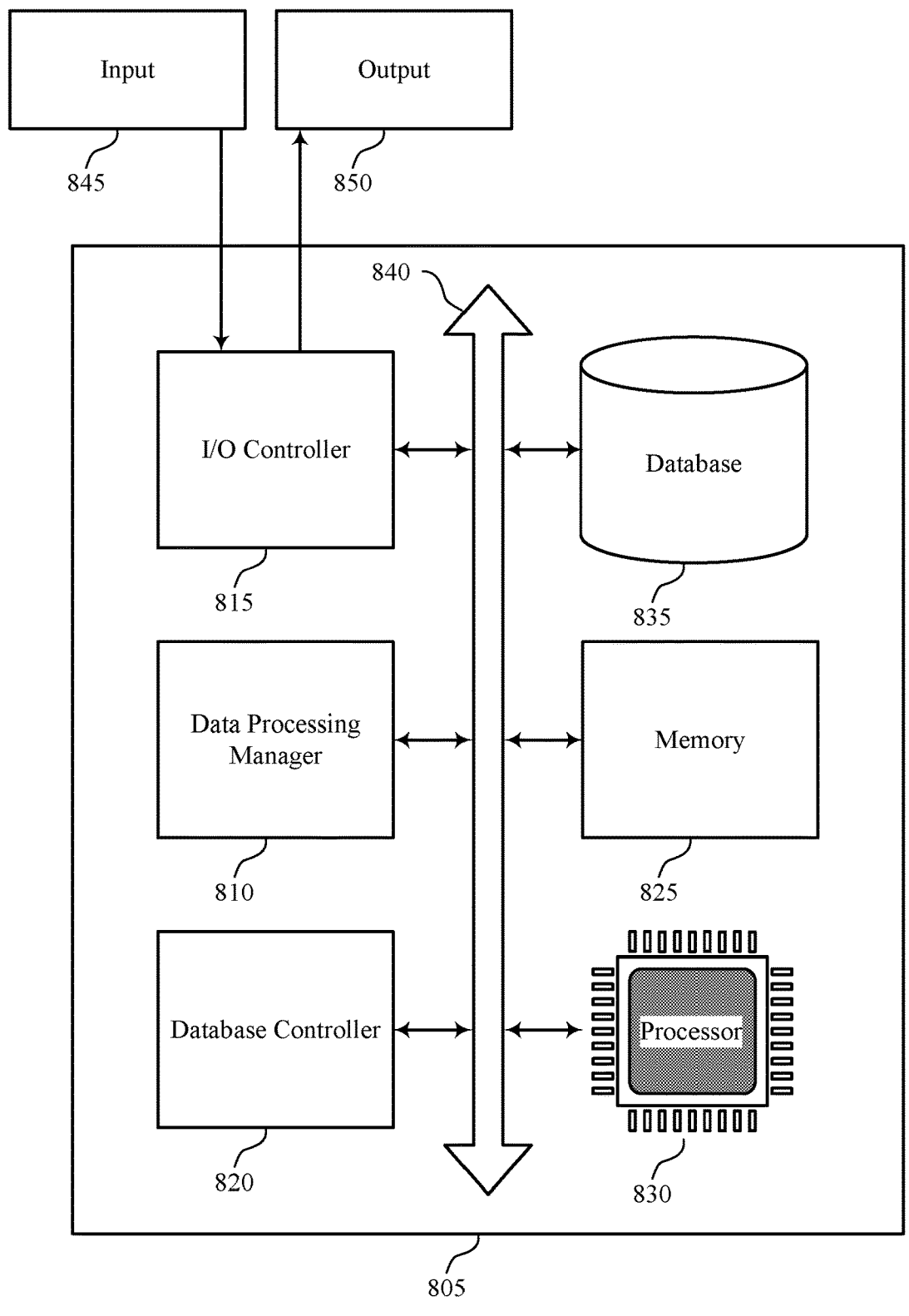
FIG. 8 shows a diagram of a system including a device that supports asynchronous batch processing in accordance with aspects of the present disclosure.

FIG. 8 shows a diagram of a system 800 including a device 805 that supports asynchronous batch processing in accordance with aspects of the present disclosure. The device 805 may be an example of or include the components of a database server or an apparatus 605 as described herein. The device 805 may include components for bi-directional data communications including components for transmitting and receiving communications, including a data processing manager 810, an I/O controller 815, a database controller 820, memory 825, a processor 830, and a database 835. These components may be in electronic communication via one or more buses (e.g., bus 840).

The data processing manager 810 may be an example of a data processing manager 615 or 705 as described herein. For example, the data processing manager 810 may perform any of the methods or processes described herein with reference to FIGS. 6 and 7. In some cases, the data processing manager 810 may be implemented in hardware, software executed by a processor, firmware, or any combination thereof.

The I/O controller 815 may manage input signals 845 and output signals 850 for the device 805. The I/O controller 815 may also manage peripherals not integrated into the device 805. In some cases, the I/O controller 815 may represent a physical connection or port to an external peripheral. In some cases, the I/O controller 815 may utilize an operating system such as iOS®, ANDROID®, MS-DOS®, MS-WINDOWS®, OS/2®, UNIX®, LINUX®, or another known operating system. In other cases, the I/O controller 815 may represent or interact with a modem, a keyboard, a mouse, a touchscreen, or a similar device. In some cases, the I/O controller 815 may be implemented as part of a processor. In some cases, a user may interact with the device 805 via the I/O controller 815 or via hardware components controlled by the I/O controller 815.

The database controller 820 may manage data storage and processing in a database 835. In some cases, a user may interact with the database controller 820. In other cases, the database controller 820 may operate automatically without user interaction. The database 835 may be an example of a single database, a distributed database, multiple distributed databases, a data store, a data lake, or an emergency backup database.

Memory 825 may include random-access memory (RAM) and read-only memory (ROM). The memory 825 may store computer-readable, computer-executable software including instructions that, when executed, cause the processor to perform various functions described herein. In some cases, the memory 825 may contain, among other things, a basic input/output system (BIOS) which may control basic hardware or software operation such as the interaction with peripheral components or devices.

The processor 830 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, the processor 830 may be configured to operate a memory array using a memory controller. In other cases, a memory controller may be integrated into the processor 830. The processor 830 may be configured to execute computer-readable instructions stored in a memory 825 to perform various functions (e.g., functions or tasks supporting data system with asynchronous batch processing).

Figure 9:
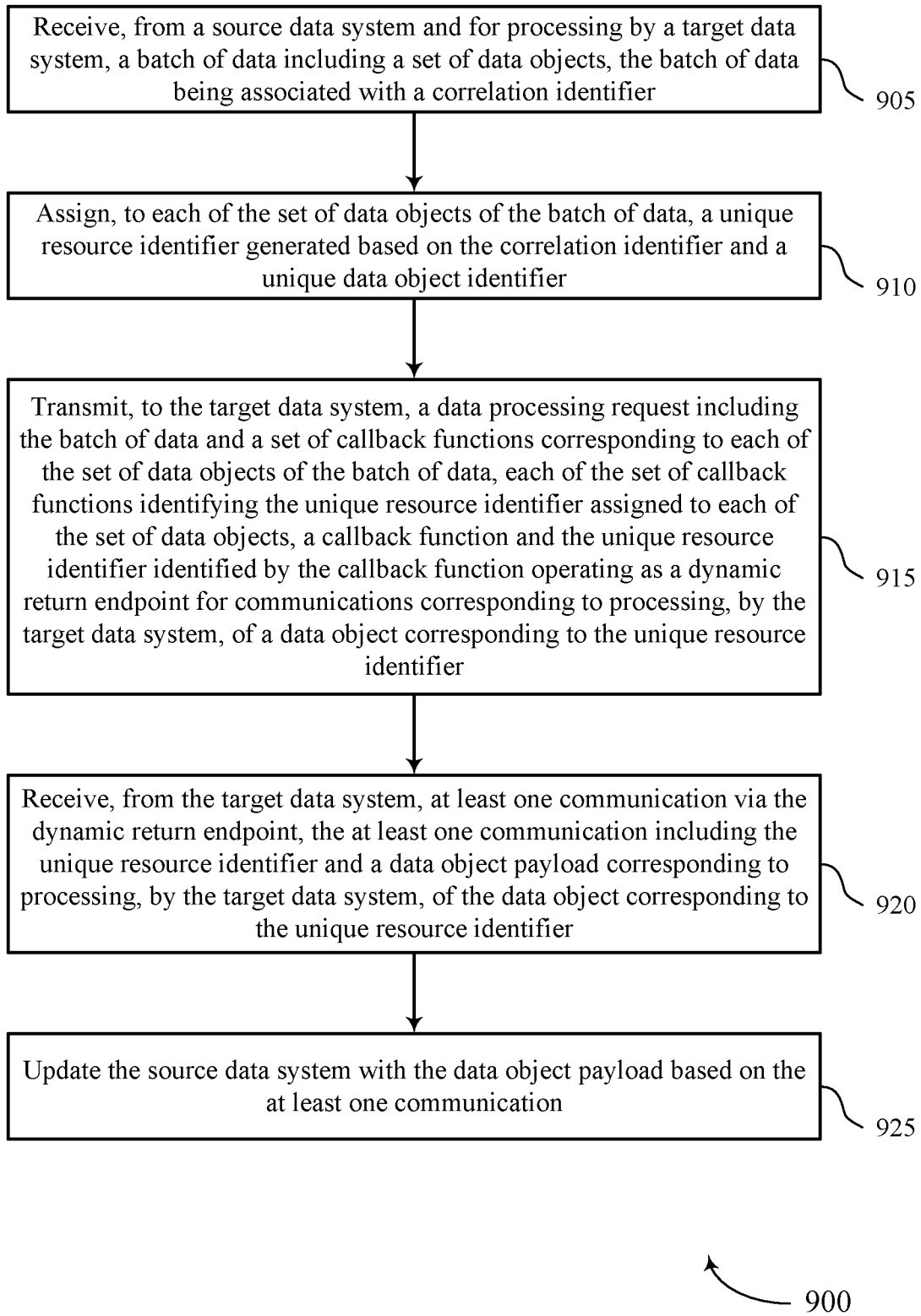
FIGS. 9 through 11 show flowcharts illustrating methods that support asynchronous batch processing in accordance with aspects of the present disclosure.

FIG. 9 shows a flowchart illustrating a method 900 that supports asynchronous batch processing in accordance with aspects of the present disclosure. The operations of method 900 may be implemented by a database server or its components as described herein. For example, the operations of method 900 may be performed by a data processing manager as described with reference to FIGS. 6 through 8. In some examples, a database server may execute a set of instructions to control the functional elements of the database server to perform the functions described herein. Additionally or alternatively, a database server may perform aspects of the functions described herein using special-purpose hardware.

At 905, the database server may receive, from a source data system and for processing by a target data system, a batch of data including a set of data objects, the batch of data being associated with a correlation identifier. The operations of 905 may be performed according to the methods described herein. In some examples, aspects of the operations of 905 may be performed by a source data system interface as described with reference to FIGS. 6 through 8.

At 910, the database server may assign, to each of the set of data objects of the batch of data, a unique resource identifier generated based on the correlation identifier and a unique data object identifier. The operations of 910 may be performed according to the methods described herein. In some examples, aspects of the operations of 910 may be performed by an unique resource identifier component as described with reference to FIGS. 6 through 8.

At 915, the database server may transmit, to the target data system, a data processing request including the batch of data and a set of callback functions corresponding to each of the set of data objects of the batch of data, each of the set of callback functions identifying the unique resource identifier assigned to each of the set of data objects, a callback function and the unique resource identifier identified by the callback function operating as a dynamic return endpoint for communications corresponding to processing, by the target data system, of a data object corresponding to the unique resource identifier. The operations of 915 may be performed according to the methods described herein. In some examples, aspects of the operations of 915 may be performed by a callback component as described with reference to FIGS. 6 through 8.

At 920, the database server may receive, from the target data system, at least one communication via the dynamic return endpoint, the at least one communication including the unique resource identifier and a data object payload corresponding to processing, by the target data system, of the data object corresponding to the unique resource identifier. The operations of 920 may be performed according to the methods described herein. In some examples, aspects of the operations of 920 may be performed by a target data system interface as described with reference to FIGS. 6 through 8.

At 925, the database server may update the source data system with the data object payload based on the at least one communication. The operations of 925 may be performed according to the methods described herein. In some examples, aspects of the operations of 925 may be performed by a source data system interface as described with reference to FIGS. 6 through 8.

Figure 10:
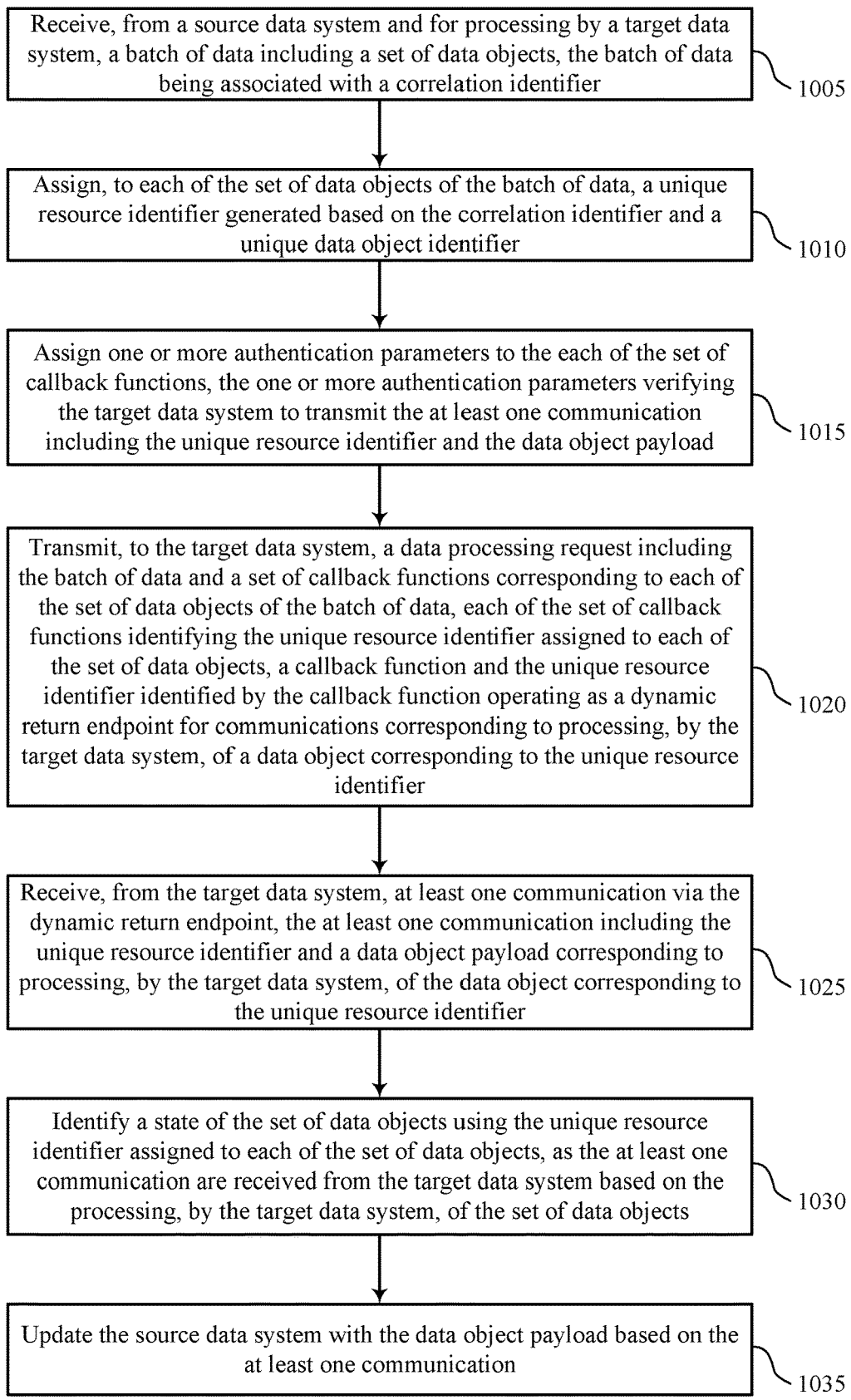

FIG. 10 shows a flowchart illustrating a method 1000 that supports asynchronous batch processing in accordance with aspects of the present disclosure. The operations of method 1000 may be implemented by a database server or its components as described herein. For example, the operations of method 1000 may be performed by a data processing manager as described with reference to FIGS. 6 through 8. In some examples, a database server may execute a set of instructions to control the functional elements of the database server to perform the functions described herein. Additionally or alternatively, a database server may perform aspects of the functions described herein using special-purpose hardware.

At 1005, the database server may receive, from a source data system and for processing by a target data system, a batch of data including a set of data objects, the batch of data being associated with a correlation identifier. The operations of 1005 may be performed according to the methods described herein. In some examples, aspects of the operations of 1005 may be performed by a source data system interface as described with reference to FIGS. 6 through 8.

At 1010, the database server may assign, to each of the set of data objects of the batch of data, a unique resource identifier generated based on the correlation identifier and a unique data object identifier. The operations of 1010 may be performed according to the methods described herein. In some examples, aspects of the operations of 1010 may be performed by an unique resource identifier component as described with reference to FIGS. 6 through 8.

At 1015, the database server may assign one or more authentication parameters to the each of the set of callback functions, the one or more authentication parameters verifying the target data system to transmit the at least one communication including the unique resource identifier and the data object payload. The operations of 1015 may be performed according to the methods described herein. In some examples, aspects of the operations of 1015 may be performed by an authentication component as described with reference to FIGS. 6 through 8.

At 1020, the database server may transmit, to the target data system, a data processing request including the batch of data and a set of callback functions corresponding to each of the set of data objects of the batch of data, each of the set of callback functions identifying the unique resource identifier assigned to each of the set of data objects, a callback function and the unique resource identifier identified by the callback function operating as a dynamic return endpoint for communications corresponding to processing, by the target data system, of a data object corresponding to the unique resource identifier. The operations of 1020 may be performed according to the methods described herein. In some examples, aspects of the operations of 1020 may be performed by a callback component as described with reference to FIGS. 6 through 8.

At 1025, the database server may receive, from the target data system, at least one communication via the dynamic return endpoint, the at least one communication including the unique resource identifier and a data object payload corresponding to processing, by the target data system, of the data object corresponding to the unique resource identifier. The operations of 1025 may be performed according to the methods described herein. In some examples, aspects of the operations of 1025 may be performed by a target data system interface as described with reference to FIGS. 6 through 8.

At 1030, the database server may identify a state of the set of data objects using the unique resource identifier assigned to each of the set of data objects, as the at least one communication are received from the target data system based on the processing, by the target data system, of the set of data objects. The operations of 1030 may be performed according to the methods described herein. In some examples, aspects of the operations of 1030 may be performed by a state managing component as described with reference to FIGS. 6 through 8.

At 1035, the database server may update the source data system with the data object payload based on the at least one communication. The operations of 1035 may be performed according to the methods described herein. In some examples, aspects of the operations of 1035 may be performed by a source data system interface as described with reference to FIGS. 6 through 8.

Figure 11:
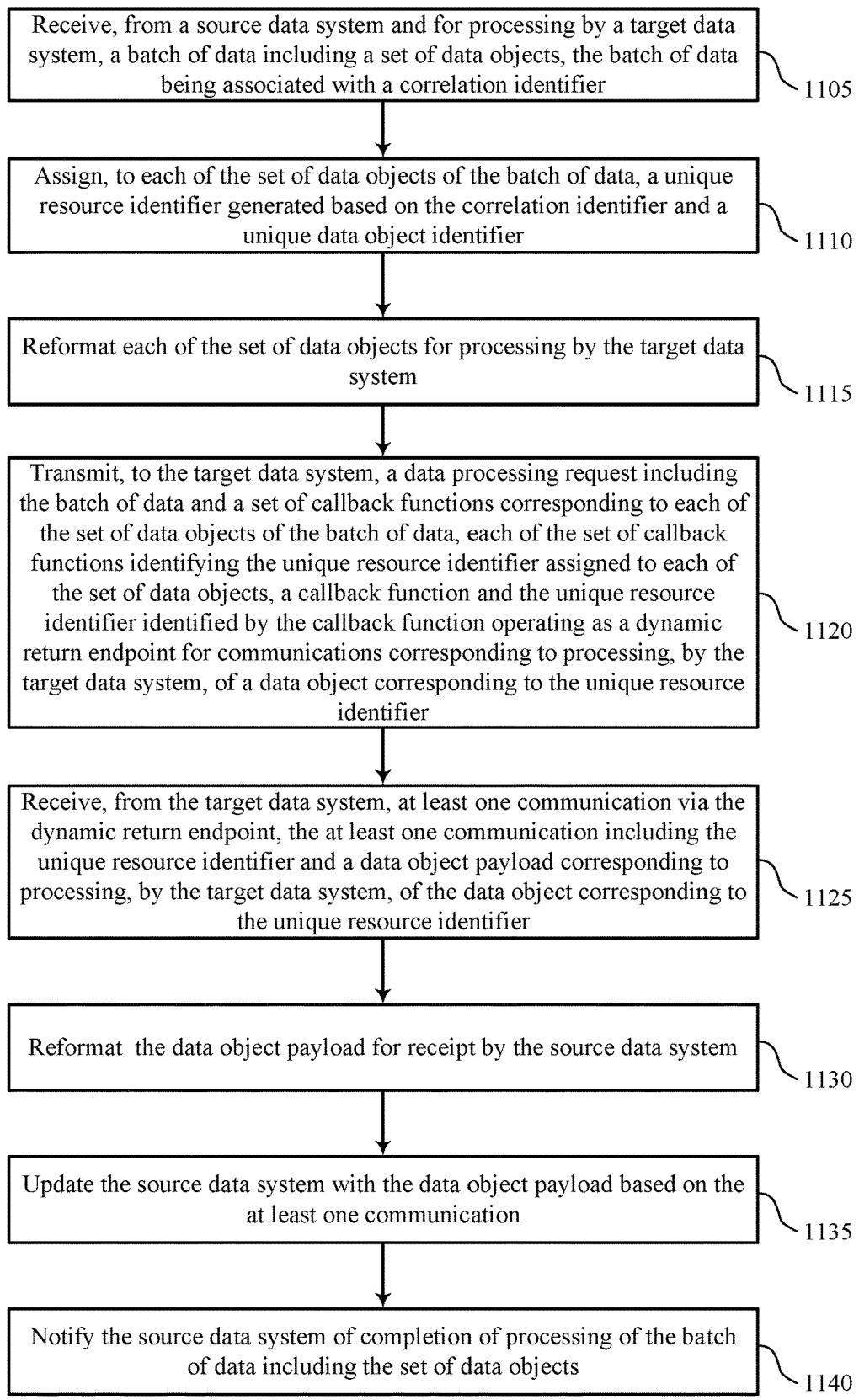

FIG. 11 shows a flowchart illustrating a method 1100 that supports asynchronous batch processing in accordance with aspects of the present disclosure. The operations of method 1100 may be implemented by a database server or its components as described herein. For example, the operations of method 1100 may be performed by a data processing manager as described with reference to FIGS. 6 through 8. In some examples, a database server may execute a set of instructions to control the functional elements of the database server to perform the functions described herein. Additionally or alternatively, a database server may perform aspects of the functions described herein using special-purpose hardware.

At 1105, the database server may receive, from a source data system and for processing by a target data system, a batch of data including a set of data objects, the batch of data being associated with a correlation identifier. The operations of 1105 may be performed according to the methods described herein. In some examples, aspects of the operations of 1105 may be performed by a source data system interface as described with reference to FIGS. 6 through 8.

At 1110, the database server may assign, to each of the set of data objects of the batch of data, a unique resource identifier generated based on the correlation identifier and a unique data object identifier. The operations of 1110 may be performed according to the methods described herein. In some examples, aspects of the operations of 1110 may be performed by an unique resource identifier component as described with reference to FIGS. 6 through 8.

At 1115, the database server may reformat each of the set of data objects for processing by the target data system. The operations of 1115 may be performed according to the methods described herein. In some examples, aspects of the operations of 1115 may be performed by a target data system formatting component as described with reference to FIGS. 6 through 8.

At 1120, the database server may transmit, to the target data system, a data processing request including the batch of data and a set of callback functions corresponding to each of the set of data objects of the batch of data, each of the set of callback functions identifying the unique resource identifier assigned to each of the set of data objects, a callback function and the unique resource identifier identified by the callback function operating as a dynamic return endpoint for communications corresponding to processing, by the target data system, of a data object corresponding to the unique resource identifier. The operations of 1120 may be performed according to the methods described herein. In some examples, aspects of the operations of 1120 may be performed by a callback component as described with reference to FIGS. 6 through 8.

At 1125, the database server may receive, from the target data system, at least one communication via the dynamic return endpoint, the at least one communication including the unique resource identifier and a data object payload corresponding to processing, by the target data system, of the data object corresponding to the unique resource identifier. The operations of 1125 may be performed according to the methods described herein. In some examples, aspects of the operations of 1125 may be performed by a target data system interface as described with reference to FIGS. 6 through 8.

At 1130, the database server may reformat the data object payload for receipt by the source data system. The operations of 1130 may be performed according to the methods described herein. In some examples, aspects of the operations of 1130 may be performed by a source data system formatting component as described with reference to FIGS. 6 through 8.

At 1135, the database server may update the source data system with the data object payload based on the at least one communication. The operations of 1135 may be performed according to the methods described herein. In some examples, aspects of the operations of 1135 may be performed by a source data system interface as described with reference to FIGS. 6 through 8.

At 1140, the database server may notify the source data system of completion of processing of the batch of data including the set of data objects. The operations of 1140 may be performed according to the methods described herein. In some examples, aspects of the operations of 1140 may be performed by a source data system interface as described with reference to FIGS. 6 through 8.

A method of data processing is described. The method may include receiving, from a source data system and for processing by a target data system, a batch of data including a set of data objects, the batch of data being associated with a correlation identifier, assigning, to each of the set of data objects of the batch of data, a unique resource identifier generated based on the correlation identifier and a unique data object identifier, transmitting, to the target data system, a data processing request including the batch of data and a set of callback functions corresponding to each of the set of data objects of the batch of data, each of the set of callback functions identifying the unique resource identifier assigned to each of the set of data objects, a callback function and the unique resource identifier identified by the callback function operating as a dynamic return endpoint for communications corresponding to processing, by the target data system, of a data object corresponding to the unique resource identifier, receiving, from the target data system, at least one communication via the dynamic return endpoint, the at least one communication including the unique resource identifier and a data object payload corresponding to processing, by the target data system, of the data object corresponding to the unique resource identifier, and updating the source data system with the data object payload based on the at least one communication.

An apparatus for data processing is described. The apparatus may include a processor, memory in electronic communication with the processor, and instructions stored in the memory. The instructions may be executable by the processor to cause the apparatus to receive, from a source data system and for processing by a target data system, a batch of data including a set of data objects, the batch of data being associated with a correlation identifier, assign, to each of the set of data objects of the batch of data, a unique resource identifier generated based on the correlation identifier and a unique data object identifier, transmit, to the target data system, a data processing request including the batch of data and a set of callback functions corresponding to each of the set of data objects of the batch of data, each of the set of callback functions identifying the unique resource identifier assigned to each of the set of data objects, a callback function and the unique resource identifier identified by the callback function operating as a dynamic return endpoint for communications corresponding to processing, by the target data system, of a data object corresponding to the unique resource identifier, receive, from the target data system, at least one communication via the dynamic return endpoint, the at least one communication including the unique resource identifier and a data object payload corresponding to processing, by the target data system, of the data object corresponding to the unique resource identifier, and update the source data system with the data object payload based on the at least one communication.

Another apparatus for data processing is described. The apparatus may include means for receiving, from a source data system and for processing by a target data system, a batch of data including a set of data objects, the batch of data being associated with a correlation identifier, assigning, to each of the set of data objects of the batch of data, a unique resource identifier generated based on the correlation identifier and a unique data object identifier, transmitting, to the target data system, a data processing request including the batch of data and a set of callback functions corresponding to each of the set of data objects of the batch of data, each of the set of callback functions identifying the unique resource identifier assigned to each of the set of data objects, a callback function and the unique resource identifier identified by the callback function operating as a dynamic return endpoint for communications corresponding to processing, by the target data system, of a data object corresponding to the unique resource identifier, receiving, from the target data system, at least one communication via the dynamic return endpoint, the at least one communication including the unique resource identifier and a data object payload corresponding to processing, by the target data system, of the data object corresponding to the unique resource identifier, and updating the source data system with the data object payload based on the at least one communication.

A non-transitory computer-readable medium storing code for data processing is described. The code may include instructions executable by a processor to receive, from a source data system and for processing by a target data system, a batch of data including a set of data objects, the batch of data being associated with a correlation identifier, assign, to each of the set of data objects of the batch of data, a unique resource identifier generated based on the correlation identifier and a unique data object identifier, transmit, to the target data system, a data processing request including the batch of data and a set of callback functions corresponding to each of the set of data objects of the batch of data, each of the set of callback functions identifying the unique resource identifier assigned to each of the set of data objects, a callback function and the unique resource identifier identified by the callback function operating as a dynamic return endpoint for communications corresponding to processing, by the target data system, of a data object corresponding to the unique resource identifier, receive, from the target data system, at least one communication via the dynamic return endpoint, the at least one communication including the unique resource identifier and a data object payload corresponding to processing, by the target data system, of the data object corresponding to the unique resource identifier, and update the source data system with the data object payload based on the at least one communication.

Some examples of the method, apparatuses, and non-transitory computer-readable medium described herein may further include operations, features, means, or instructions for identifying a state of the set of data objects using the unique resource identifier assigned to each of the set of data objects, as the at least one communication may be received from the target data system based on the processing, by the target data system, of the set of data objects.

Some examples of the method, apparatuses, and non-transitory computer-readable medium described herein may further include operations, features, means, or instructions for assigning one or more authentication parameters to the each of the set of callback functions, the one or more authentication parameters verifying the target data system to transmit the at least one communication including the unique resource identifier and the data object payload.

Some examples of the method, apparatuses, and non-transitory computer-readable medium described herein may further include operations, features, means, or instructions for reformatting each of the set of data objects for processing by the target data system.

Some examples of the method, apparatuses, and non-transitory computer-readable medium described herein may further include operations, features, means, or instructions for reformatting the data object payload for receipt by the source data system.

Some examples of the method, apparatuses, and non-transitory computer-readable medium described herein may further include operations, features, means, or instructions for notifying the source data system of completion of processing of the batch of data including the set of data objects.

Some examples of the method, apparatuses, and non-transitory computer-readable medium described herein may further include operations, features, means, or instructions for receiving, from the source data system, a status report request corresponding to the processing of the batch of data by the target data system and transmitting, to the source data system, a status report indicating processing status corresponding to processing of the batch of data by the target data system.

Some examples of the method, apparatuses, and non-transitory computer-readable medium described herein may further include operations, features, means, or instructions for generating the unique resource identifier by concatenating the correlation identifier and the unique data object identifier.

In some examples of the method, apparatuses, and non-transitory computer-readable medium described herein, the data object payload indicates a recommendation corresponding to the data object corresponding to the unique resource identifier.

It should be noted that the methods described herein describe possible implementations, and that the operations and the steps may be rearranged or otherwise modified and that other implementations are possible. Furthermore, aspects from two or more of the methods may be combined.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a digital signal processor (DSP) and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for data processing, comprising:
receiving, from a source data system and for processing by a target data system, a batch of data including a set of data objects, the batch of data being associated with a correlation identifier;
assigning, to each of the set of data objects of the batch of data, a unique resource identifier generated based at least in part on the correlation identifier and a unique data object identifier;
transmitting, to the target data system, a data processing request including the batch of data and a set of callback functions corresponding to each of the set of data objects of the batch of data, each of the set of callback functions identifying the unique resource identifier assigned to each of the set of data objects, a callback function and the unique resource identifier identified by the callback function operating as a dynamic return endpoint for communications corresponding to processing, by the target data system, of a data object corresponding to the unique resource identifier;
receiving, from the target data system, at least one communication via the dynamic return endpoint, the at least one communication including the unique resource identifier and a data object payload corresponding to processing, by the target data system, of the data object corresponding to the unique resource identifier; and
updating the source data system with the data object payload based on the at least one communication.

2. The method of claim 1, further comprising:
identifying a state of the set of data objects using the unique resource identifier assigned to each of the set of data objects, as the at least one communication are received from the target data system based on the processing, by the target data system, of the set of data objects.

3. The method of claim 1, further comprising:
assigning one or more authentication parameters to the each of the set of callback functions, the one or more authentication parameters verifying the target data system to transmit the at least one communication including the unique resource identifier and the data object payload.

4. The method of claim 1, further comprising:
reformatting each of the set of data objects for processing by the target data system.

5. The method of claim 1, further comprising:
reformatting the data object payload for receipt by the source data system.

6. The method of claim 1, further comprising:
notifying the source data system of completion of processing of the batch of data including the set of data objects.

7. The method of claim 1, further comprising:
receiving, from the source data system, a status report request corresponding to the processing of the batch of data by the target data system; and
transmitting, to the source data system, a status report indicating processing status corresponding to processing of the batch of data by the target data system.

8. The method of claim 1, further comprising:
generating the unique resource identifier by concatenating the correlation identifier and the unique data object identifier.

9. The method of claim 1, wherein the data object payload indicates a recommendation corresponding to the data object corresponding to the unique resource identifier.

10. The method of claim 9, wherein the recommendation is a marketing recommendation and the data object corresponds to a user or a user device.

11. The method of claim 1, wherein the source data system transitions to a sleep state responsive to transmitting the batch of data for processing by the target data system.

12. The method of claim 1, wherein receiving the batch of data including the set of data objects comprises:
receiving, a set of fields for each data object, wherein each field of the set of fields corresponds to an attribute of the data object that is to be processed by the target data system.

13. An apparatus for data processing, comprising:
a processor, memory in electronic communication with the processor; and
instructions stored in the memory and executable by the processor to cause the apparatus to:
receive, from a source data system and for processing by a target data system, a batch of data including a set of data objects, the batch of data being associated with a correlation identifier;
assign, to each of the set of data objects of the batch of data, a unique resource identifier generated based at least in part on the correlation identifier and a unique data object identifier;
transmit, to the target data system, a data processing request including the batch of data and a set of callback functions corresponding to each of the set of data objects of the batch of data, each of the set of callback functions identifying the unique resource identifier assigned to each of the set of data objects, a callback function and the unique resource identifier identified by the callback function operating as a dynamic return endpoint for communications corresponding to processing, by the target data system, of a data object corresponding to the unique resource identifier;
receive, from the target data system, at least one communication via the dynamic return endpoint, the at least one communication including the unique resource identifier and a data object payload corresponding to processing, by the target data system, of the data object corresponding to the unique resource identifier; and
update the source data system with the data object payload based on the at least one communication.

14. The apparatus of claim 13, wherein the instructions are further executable by the processor to cause the apparatus to:
identify a state of the set of data objects using the unique resource identifier assigned to each of the set of data objects, as the at least one communication are received from the target data system based on the processing, by the target data system, of the set of data objects.

15. The apparatus of claim 13, wherein the instructions are further executable by the processor to cause the apparatus to:
assign one or more authentication parameters to the each of the set of callback functions, the one or more authentication parameters verifying the target data system to transmit the at least one communication including the unique resource identifier and the data object payload.

16. The apparatus of claim 13, wherein the instructions are further executable by the processor to cause the apparatus to:
reformat each of the set of data objects for processing by the target data system.

17. A non-transitory computer-readable medium storing code for data processing, the code comprising instructions executable by a processor to:
receive, from a source data system and for processing by a target data system, a batch of data including a set of data objects, the batch of data being associated with a correlation identifier;
assign, to each of the set of data objects of the batch of data, a unique resource identifier generated based at least in part on the correlation identifier and a unique data object identifier;
transmit, to the target data system, a data processing request including the batch of data and a set of callback functions corresponding to each of the set of data objects of the batch of data, each of the set of callback functions identifying the unique resource identifier assigned to each of the set of data objects, a callback function and the unique resource identifier identified by the callback function operating as a dynamic return endpoint for communications corresponding to processing, by the target data system, of a data object corresponding to the unique resource identifier;
receive, from the target data system, at least one communication via the dynamic return endpoint, the at least one communication including the unique resource identifier and a data object payload corresponding to processing, by the target data system, of the data object corresponding to the unique resource identifier; and
update the source data system with the data object payload based on the at least one communication.

18. The non-transitory computer-readable medium of claim 17, wherein the instructions are further executable to:
identify a state of the set of data objects using the unique resource identifier assigned to each of the set of data objects, as the at least one communication are received from the target data system based on the processing, by the target data system, of the set of data objects.

19. The non-transitory computer-readable medium of claim 17, wherein the instructions are further executable to:

assign one or more authentication parameters to the each of the set of callback functions, the one or more authentication parameters verifying the target data system to transmit the at least one communication including the unique resource identifier and the data object payload.

20. The non-transitory computer-readable medium of claim 17, wherein the instructions are further executable to:
reformat each of the set of data objects for processing by the target data system.

21. The non-transitory computer-readable medium of claim 17, wherein the source data system transitions to a sleep state responsive to transmitting the batch of data for processing by the target data system.

\* \* \* \* \*